United States Patent [19]

Masaki et al.

[11] Patent Number: 5,790,269
[45] Date of Patent: Aug. 4, 1998

[54] METHOD AND APPARATUS FOR COMPRESSING AND DECOMPRESSING A VIDEO IMAGE

[75] Inventors: Ichiro Masaki, Acton, Mass.; Ujjaval Desai, Philadelphia, Pa.; Anantha Chandrakasan, Belmont; Berthold Horn, Carlisle, both of Mass.

[73] Assignee: Massachusetts Institute of Technology, Cambridge, Mass.

[21] Appl. No.: 570,765

[22] Filed: Dec. 12, 1995

[51] Int. Cl.⁶ ............................................. H04N 1/40
[52] U.S. Cl. .................... 358/447; 382/199; 382/201; 382/266; 382/267; 395/121
[58] Field of Search ............................ 382/112, 113, 382/159, 175, 181, 184, 193, 194, 199, 201, 209, 217, 221, 252, 266, 267, 258; 358/447, 448, 470, 525, 530, 539, 426, 425; 395/101, 114, 121, 143

[56] References Cited

U.S. PATENT DOCUMENTS

| 3,987,412 | 10/1976 | Morrin, II | 340/146.3 |
| 4,303,947 | 12/1981 | Stoffel | 358/428 |
| 4,987,357 | 1/1991 | Masaki | 318/587 |
| 5,027,422 | 6/1991 | Peregrim et al. | 382/48 |
| 5,387,947 | 2/1995 | Shin | 348/699 |

OTHER PUBLICATIONS

SGS-Thomson Microelectronics St13220, "Motion Estimation Processor" Jul. 1992, pp. 97–121.

"Second-Generation Image-Coding Techniques" Murat Kunt, Athanassios Ikonmopoulos, Michel Kocher, Proceeding of the IEEE, vol. 73, No. 4, Apr. 1985, pp. 452–476.

"On The Performance of a Contour Coding Algorithm In The Context of Image Coding Part 1: Contour Segment Coding" Murray Eden, Michel Locher, Signal Process 8 (1985), pp. 381–386.

Sketch Based Coding of Grey Level Images, Stefan Carlsson, Signal Processing vol. 15 (1988) pp. 57–83.

*Primary Examiner*—Thomas D. Lee
*Assistant Examiner*—Jerome Grant, II
*Attorney, Agent, or Firm*—Nutter, McClennan & Fish

[57] ABSTRACT

Edge or contour information is extracted from an image array by filtering and encoded. In order to improve reproduction accuracy, two separate filters are used to detect edge information. One of the filters detects "sharp" edges, or edges in which the discontinuity in pixel intensity values occurs over a range of a few pixels. The other filter detects "level" edges in which the pixel intensity value discontinuity occurs over a larger range of pixels than the "sharp" edges. The "smooth" areas between edges or contours are assumed to vary continuously between the contours, but for efficient implementation, a one-dimensional linear interpolation is used to regenerate the contour information between edges. In addition, to further improve performance, a line is fitted to the pixel intensity data. The end values of this line are then used for the pixel intensity data. In order to still further improve performance, the pixel intensity values associated with each contour are divided into groups and each group is then encoded. Another improvement is accomplished by mean coding the residual error.

14 Claims, 9 Drawing Sheets

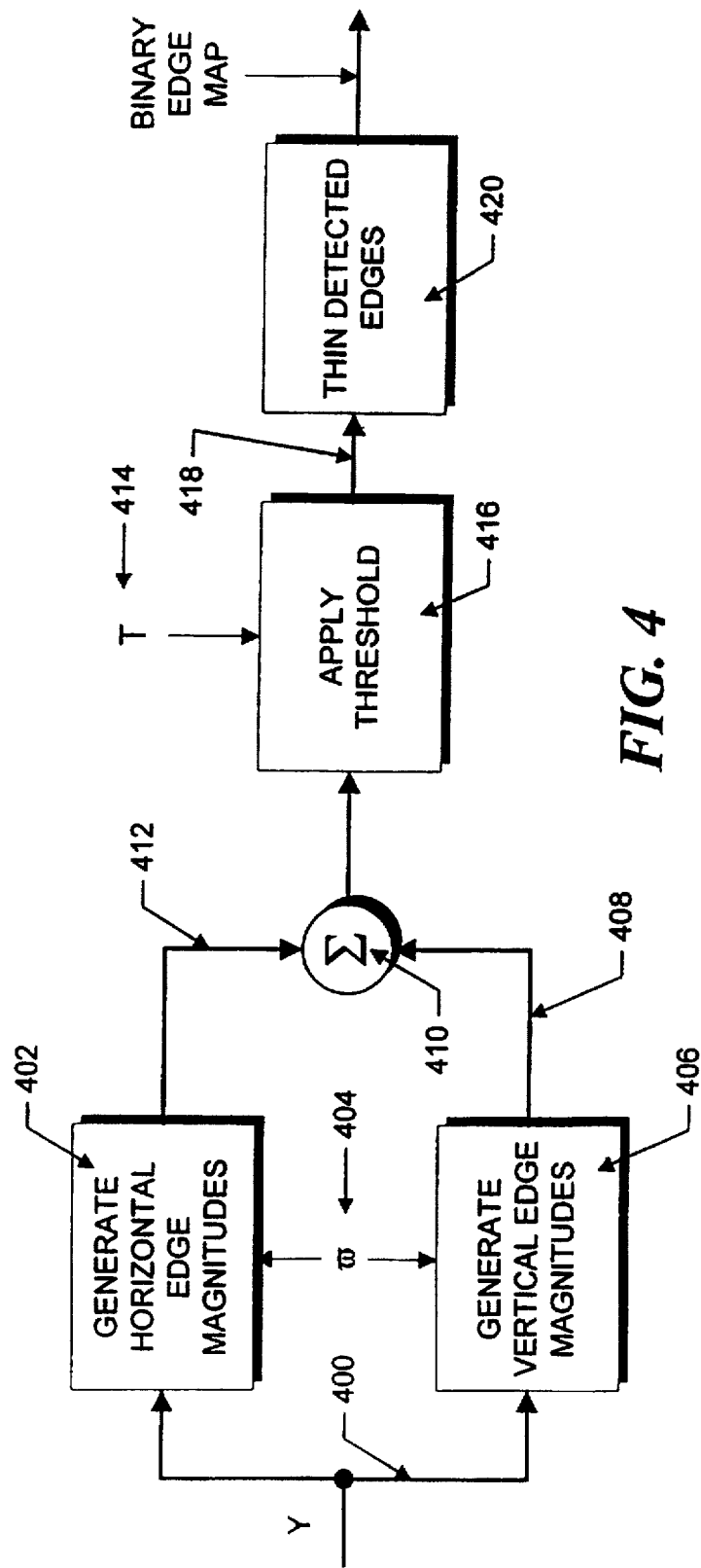

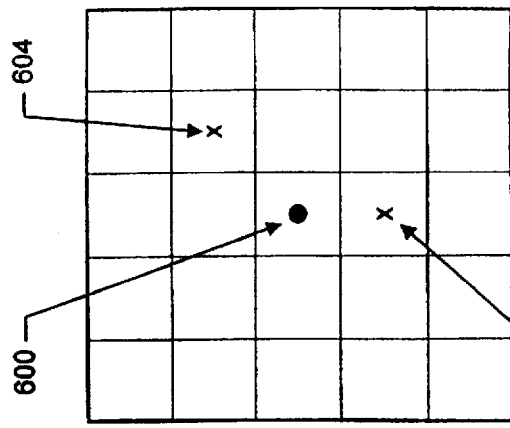
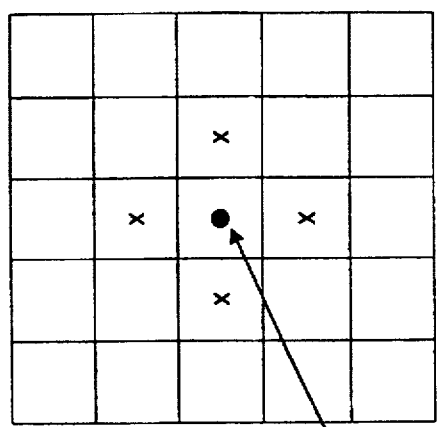
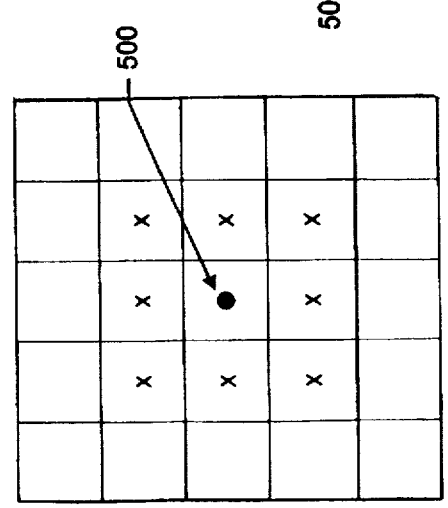
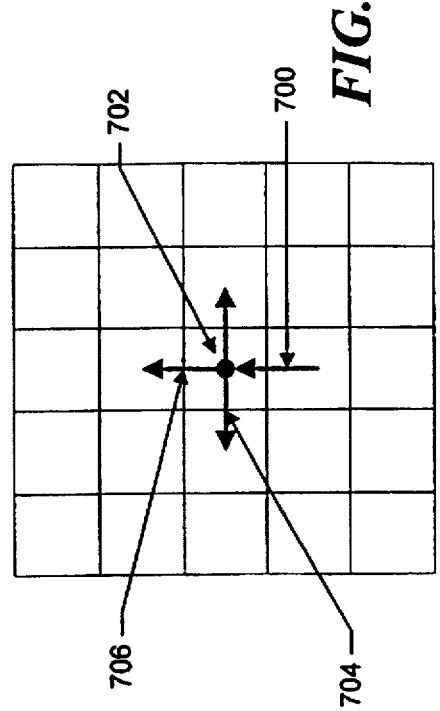
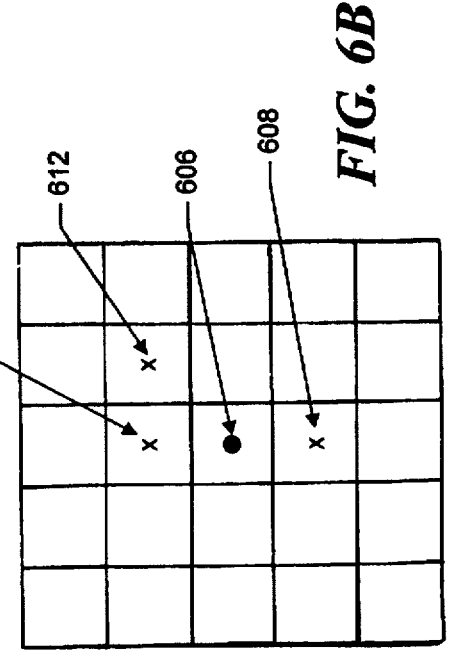
FIG. 5A
FIG. 5B
FIG. 6A
FIG. 6B
FIG. 7

METHOD AND APPARATUS FOR COMPRESSING AND DECOMPRESSING A VIDEO IMAGE

FIELD OF THE INVENTION

This invention relates to video systems and, in particular, to methods and apparatus for reducing the number of bits necessary to encode a video image into an encoded form from which an image with distortion that is acceptable to a human viewer can be reconstructed.

BACKGROUND OF THE INVENTION

The storage and transmission of full-color, full-motion images is increasingly in demand. These images are used, not only for entertainment, as in motion picture or television productions, but also for analytical and diagnostic tasks such as engineering analysis and medical imaging.

There are several advantages to providing these images in digital form in which the image is divided into an array of picture elements or "pixels", each of which has intensity values which are represented by one or more digital words. In digital form, the images are more susceptible to enhancement and manipulation, and, as with all digital signals, digital video images can be regenerated accurately over several generations with only minimal signal degradation.

On the other hand, video information requires significant memory capacity for storage and, equivalently, it requires a high-bandwidth channel for transmission. For example, a single 512 by 512 pixel gray-scale image with 256 gray levels requires more than 256,000 bytes of storage. A full color image requires nearly 800,000 bytes.

Natural-looking motion requires that images be updated at least 30 times per second. A transmission channel for natural-looking full color moving images must therefore accommodate approximately 190 million bits per second. One minute of full color video requires almost 2 gigabytes of storage.

As a result, a number of image compression techniques have been proposed to reduce the information capacity required for storage and transmission of video signals. These techniques generally take advantage of the considerable redundancy in any natural image and the limits of the human psycho-visual system. Both time-domain and spatial-domain techniques are used to reduce the amount of data used to transmit, record, and reproduce color video images.

The goal of image compression techniques is to produce an encoded version of a video image that minimizes the bit rate required to transmit the encoded version, but allows the original image to be reconstructed from the encoded version within a predetermined distortion constraint. Conventional compression techniques typically achieve bit rate reduction by exploiting correlation between pixel intensities and include techniques such as predictive or waveform coding, in which pixel correlation is reduced directly in the spatial domain, and transform coding, in which pixel intensity values are transformed into another domain such that most information is contained in a few parameters. Most of these techniques use a mean square error (MSE) distortion measure in order to make the mathematical analysis and the encoder design tractable.

For high compression ratios or low bit rate applications, standard compression techniques fail to provide satisfactory performance because the MSE measure does not provide an inadequate distortion measure in such cases. More particularly, as the transmission bit rate is reduced, it becomes increasingly more crucial to preserve those parts of the image which are perceptually significant to a human observer. Since the mean square error measure is not based on properties of the human visual system, the regenerated images in compression systems using this measure at low bit rates have distortion which is unacceptable to a human observer even though the mean square error is acceptable.

One well-known property of human visual perception is its sensitivity to edges. Consequently, several prior art techniques use edges to generate efficient image representations. Since these latter techniques can adequately regenerate the perceptually significant parts of an image, they are useful even at high compression ratios and low bit rates. In accordance with one prior art edge-based compression technique described in an article entitled *Image Transmission by Two-dimensional Contour Coding*, D. Graham, Proceedings of the IEEE, v. 55, n. 3, Mar. 1967, pp. 336–346, an image is considered to be composed of high-frequency and low-frequency parts, which are encoded separately. The high frequency part corresponds to edges or "contours" in the image, and the low frequency part corresponds to smooth areas between the contours.

Another prior art technique described in an article entitled *Image Data Compression by Contour Texture Modeling*, M. Kocher and M. Kunt, SPIE International Conference on the Applications of Digital Image Processing, Geneva, Switzerland, April 1983, pp. 131–139, uses a technique called "region growing" to segment an image into regions. The texture of each of these regions is then encoded separately.

A more refined edge-based technique is described in an articles entitled *Sketch Based Coding of Grey Level Images*, S. Carlsson, Signal Processing, v. 15, 1988, pp. 57–83. In accordance with this latter technique, edge or contour information is extracted from a digitized image by filtering and encoded. The "smooth" areas between contours are assumed to vary continuously between the contours, consequently, pixel intensity values on either side of the detected contours are also detected and encoded. In order to regenerate texture in the smooth areas between contours, an image is reconstructed from the edge and pixel intensity information using an iterative minimum variation interpolation technique. The reconstructed image is then subtracted from the original image information to produce a difference or residual information which is encoded using a conventional Laplacian pyramid encoding scheme. During decoding, the image edge information and the pixel intensity values are decoded and the pixel intensities between edges is regenerated by iterative minimum variation interpolation from this latter information. The residual information is then decoded and added to the regenerated image to produce the final reconstructed image. Although this "sketch-based" decoding works well, the resulting image still suffers from considerable distortion and the technique is complicated, resulting in an expensive implementation.

SUMMARY OF THE INVENTION

An improvement in image quality and a reduction in implementation cost has been achieved in one illustrative embodiment of the invention in which edge or contour information is extracted from an image array by filtering and encoded. In order to improve reproduction accuracy, two separate filters are used to detect edge information. One of the filters detects "sharp" edges, or edges in which the discontinuity in pixel intensity values occurs over a range of a few pixels. The other filter detects "level" edges in which the pixel intensity value discontinuity occurs over a larger range of pixels than the "sharp" edges.

The "smooth" areas between edges or contours are assumed to vary continuously between the contours, but for efficient implementation, a one-dimensional linear interpolation is used to regenerate the contour information between edges rather than the iterative minimum variation interpolation used in the prior art.

In addition, to further improve performance, rather than use the pixel intensity values on either side of the detected contours for the pixel intensity data, for each row and column of the image array, a line is fitted to the pixel intensity data. The end values of this line are then used for the pixel intensity data. This "line-fitting" of the intensity values produces a more accurate regeneration of the original image data.

In order to still further improve performance, the pixel intensity data is efficiently encoded. In particular, the pixel intensity values associated with each contour are divided into groups and each group is then encoded. In one illustrative embodiment, the groups have equal numbers of pixel intensity values and each group is encoded by using the means of the values in the group.

Another improvement is accomplished by mean coding the residual error as opposed to Laplacian pyramid coding. In particular, instead of encoding the difference between the reconstructed image and the original image, the inventive encoding technique breaks the original image into blocks and encodes each non-edge block by its mean. During the decompression process, the intensity of each "non-edge" block in the reconstructed image is set to the mean of the corresponding block in the original image. Therefore, the reconstructed image is not generated during the encoding process, resulting in a less complicated implementation.

The aforementioned improvement techniques can be used together or singly in order to obtain improved performance. Another important advantage of the inventive compression technique is that it can be used efficiently with edge-based motion estimation to encode moving images.

BRIEF DESCRIPTION OF THE DRAWING

FIG. 4 is a block schematic diagram illustrating the construction of a binary edge map for encoding the edges of a digitized video image.

FIG. 5A is an example of a portion of an eight-connected pixel array.

FIG. 5B is an example of a portion of a four-connected pixel array.

FIGS. 6A and 6B illustrate processing of an eight-connected pixel array to convert it to a four-connected pixel array.

FIG. 7 is a diagram showing possible pixel directions for the "next" pixel in a chain encoding method.

DETAILED DESCRIPTION OF A PREFERRED EMBODIMENT

In accordance with the principles of the invention, an edge-based representation of a video image consists of a binary edge map indicating the locations of edges in the image array, contour pixel data on both sides of the contours in the edge map and coded "residual" data. The binary edge map and the contour pixel data is sufficient to obtain an intelligible reconstructed image by simply interpolating the intensity information between edges on the edge map. The quality of reconstruction is then further improved by block encoding the input image and using the block encoded information to adjust the background of the interpolated image. The encoding method therefore, consists of edge detection, edge coding, contour intensity data extraction and coding, and residual coding.

Figure 1:
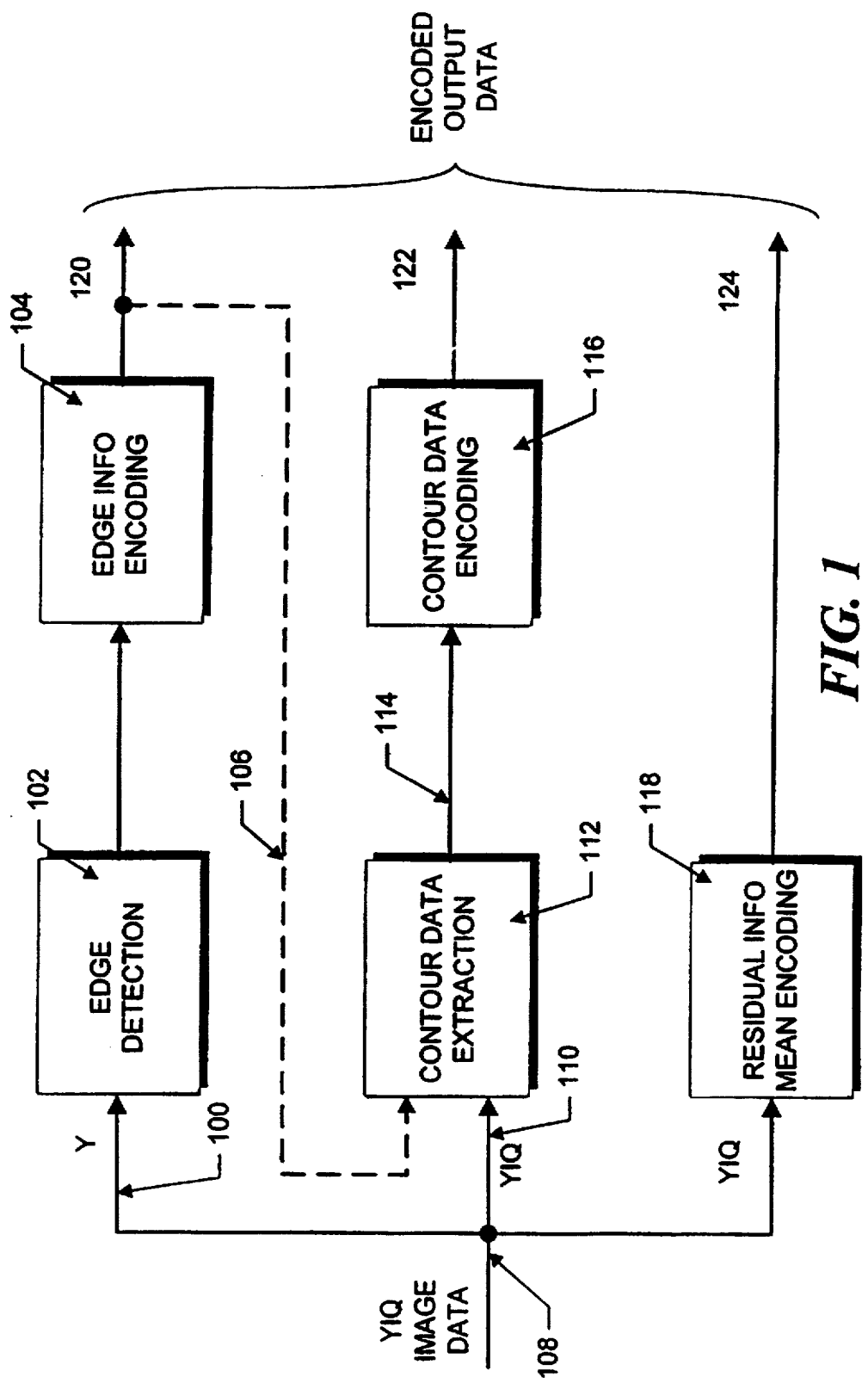
FIG. 1 is a schematic block diagram illustrating the construction of an encoder in accordance with the principles of the present invention.

The basic encoding apparatus is illustrated in the block diagram in FIG. 1 where the apparatus is used to encode a color image. The image is first digitized in a conventional manner into a row and column array. The input color image on bus 108 is assumed to be in a conventional YIQ format and there are, accordingly, three arrays, one for each of the Y, I and Q signals. Edge detection and edge encoding is performed on the luminance (Y) component alone. In particular, the luminance (Y) array is provided, via bus 100, to an edge detection apparatus 102 which extracts the positions of the array bits which comprise the edges to form a binary edge array or map. These edge positions are then encoded in the edge encoding apparatus 104 in order to reduce the number of bits necessary to reproduce the edges. The encoded edge positions form an encoded binary edge map 120 which forms part of the encoded information.

Contour data extraction and coding is performed independently on all three components. For example, each of the Y, I and Q arrays are provided, via busses 110, to the contour data extraction apparatus 112. The binary edge map 120 is also provided, via bus 106, to the contour data extraction apparatus 112. The extracted contour data on bus 114 is encoded in apparatus 116 and the encoded information 122 also forms part of the encoded data output.

The luminance component (Y) and the chrominance components (I, Q) on bus 111 are then mean encoded in apparatus 118 as will be discussed in detail below. The mean encoded information 124 is then provided as encoded "residual" data which is part of the encoded output data.

Figure 2:
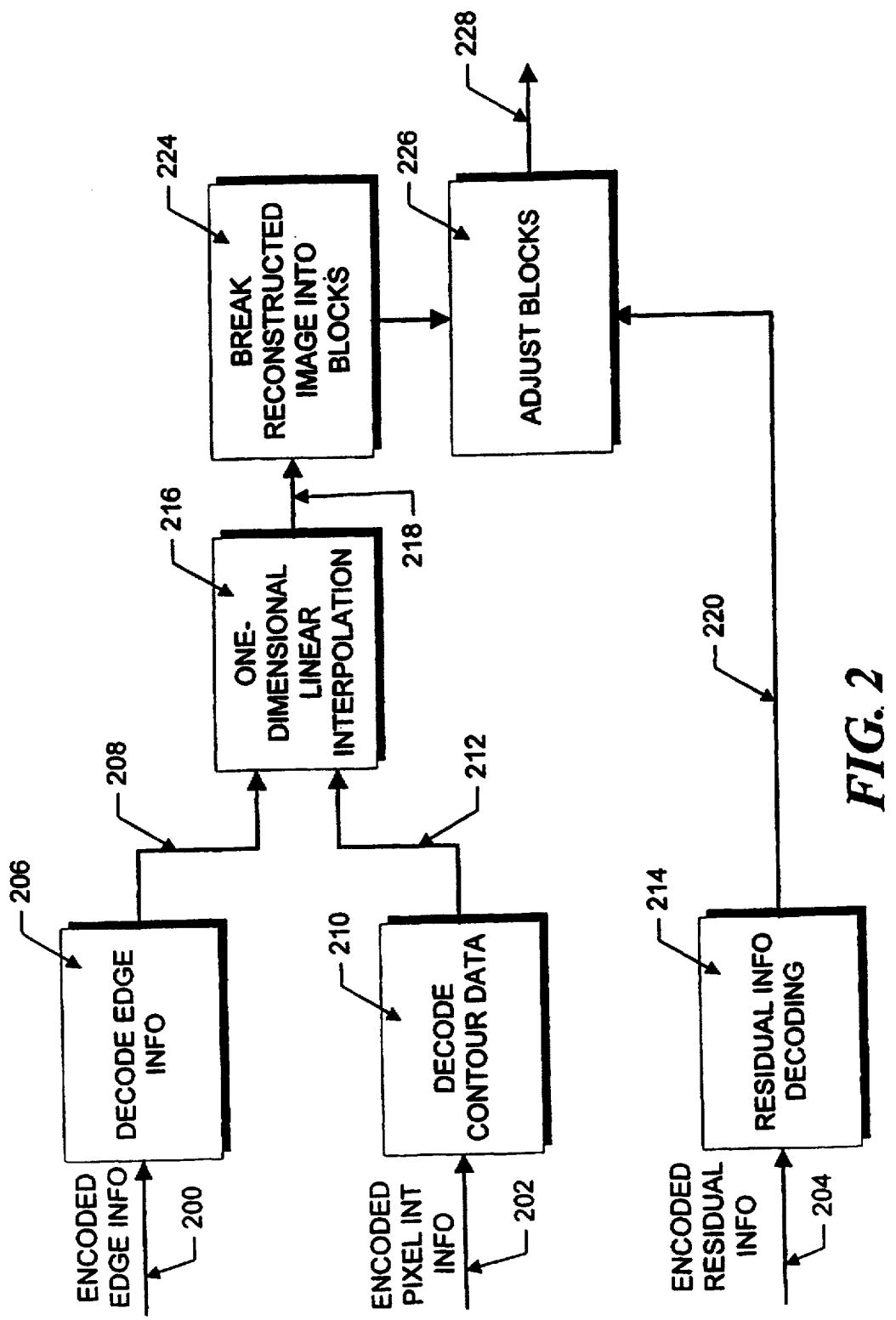
FIG. 2 is a schematic block diagram illustrating the construction of a decoder in accordance with the principles of the present invention.

The encoded information is decoded at a receiver in order to reproduce the original image data as accurately as possible given the distortion introduced by the compression ratio or bit rate constraints. A block diagram of a receiver constructed in accordance with the principles of the invention is shown in FIG. 2. The encoded information is received over a conventional transmission channel and separated into encoded edge information 200, encoded contour data information 202 and encoded residual information 204.

The encoded edge information is decoded in block 206 to regenerate the binary edge map. Similarly, the contour data information is decoded in block 210. The binary edge map and the corresponding contour data (the pixel intensities one each side of the edges) are then provided, via busses 208 and 212 to the interpolator 216. In accordance with the principles of the invention, the interpolator 216 uses a one-dimensional linear interpolation to generate contour data values between the edges in the binary edge map thereby reconstructing an array which approximates the original image. The foregoing interpolation is performed on each of the luminance and chrominance components separately to regenerate three separate image arrays.

More specifically, the receiver reconstructs all of the contour intensity data by interpolating the contour data between edges. Since the number of contour data pixels is much less than the total number of pixels in the image, edge-based representation can be used for low bit rate image compression. The reconstructed image is obtained by averaging the results of horizontal and vertical interpolation. In horizontal interpolation, the binary edge map is scanned row by row, and the intensity values between two consecutive edge points on a row are obtained by linearly interpolating the corresponding contour intensity data. The same process is repeated for vertical interpolation, but this time the image is scanned column by column. As previously mentioned, linear interpolation is used in order to simplify the implementation.

The regenerated arrays are provided via busses 218 to apparatus 224 which breaks the image arrays into blocks. Specifically, the luminance component array is divided into 10×10 blocks, while the chrominance components are divided into 20×20 blocks. This processing takes into account that a human observer is less sensitive to chrominance variations than luminance variations. The encoded residual information is decoded in block 214 and provided over line 220 to an adjustment apparatus 226 where non-edge blocks are adjusted as discussed below to eliminate various artifacts produced by the encoding process. The reconstructed image is generated on output 228.

Edge Detection

Figure 3:
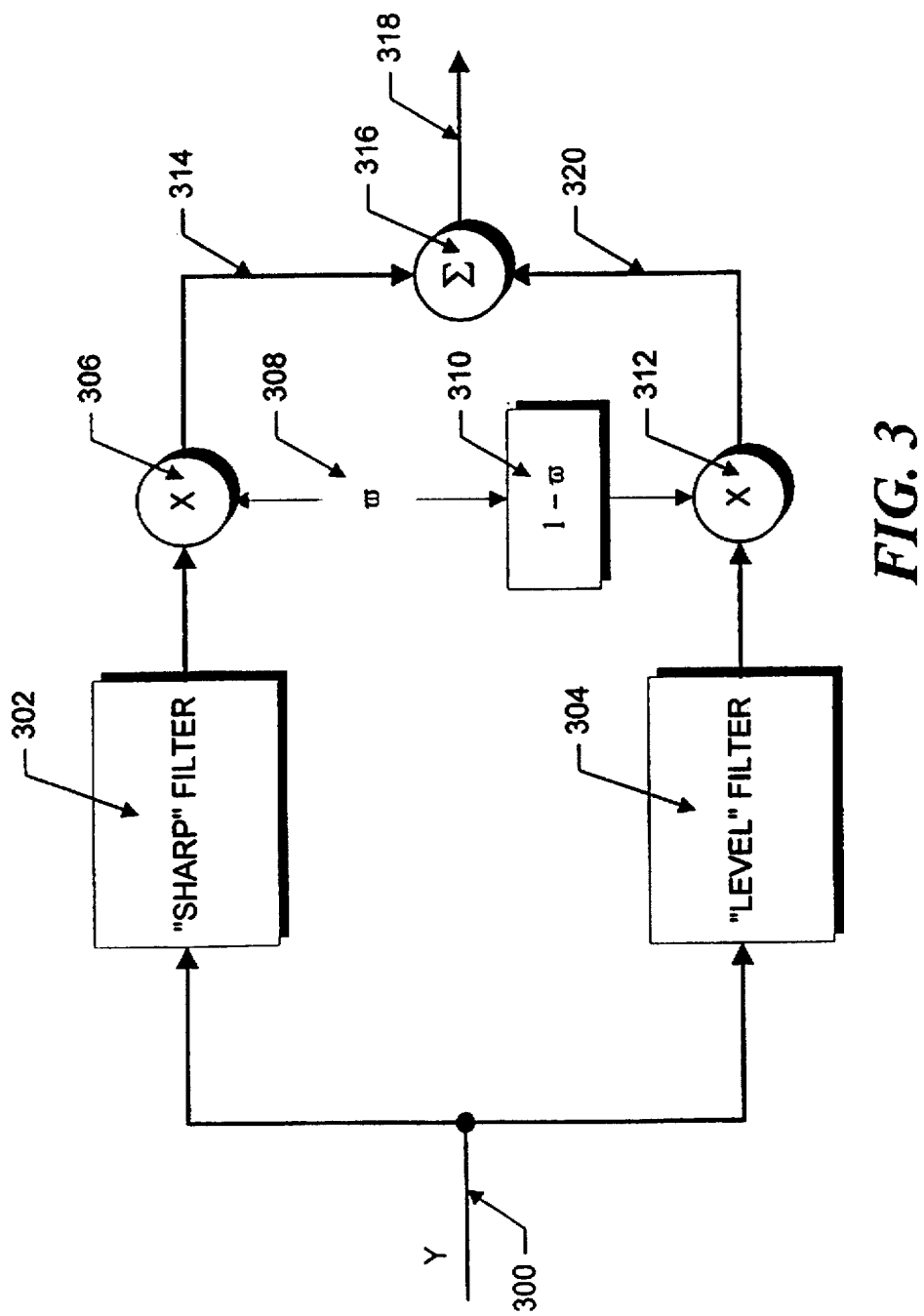
FIG. 3 is an expanded block diagram illustrating the dual sharp and level filters used to detect edges in a digitized video image.

The edge detection step is illustrated in FIGS. 3 and 4. The first step in generating a binary edge map is to locate the positions of "edges" in the image array. The edges can be located using one of several well-known methods for locating edges in an array of values. An edge detection mechanism called the "Sobel operator" was selected for edge detection in a preferred embodiment because of its simplicity and good performance. However, any other efficient edge detection method can be used without significantly affecting the performance of the overall method and apparatus.

In edge detection methods using the Sobel operator, the array of input image values are convolved with two filter matrices: $h_x$ and $h_y$. The form of these matrices is shown below:

$$h_x = \begin{bmatrix} -1 & 0 & 1 \\ -2 & 0 & 2 \\ -1 & 0 & 1 \end{bmatrix}$$

$$h_y = \begin{bmatrix} -1 & -2 & -1 \\ 0 & 0 & 0 \\ 1 & 2 & 1 \end{bmatrix}$$

The matrix $h_x$ corresponds to horizontal differentiation (and responds to vertical edges), while the matrix filter $h_y$ corresponds to vertical differentiation (and responds to horizontal edges). The results of the two convolutions, $S_x = I*h_x$ and $S_y = I*h_y$ (where I is the Y luminance array of the input image) are combined in the following way to obtain a Sobel edge-intensity map $(S_{mag})$: $S_{mag} = \sqrt{S_x^2 + S_y^2}$ The edges obtained using the Sobel technique are usually very "sharp". In this context, the term "sharp" means that the discontinuity in the pixel intensity values occurs over a range of a few pixels. In accordance with the principles of the invention, in order to obtain more slowly-varying edges, a "level" edge detection mechanism is used in conjunction with the Sobel edge detection technique. Level edges are detected in exactly the same way as Sobel edges, but with different filters:

$$\hat{h}_x = \begin{bmatrix} -1 & 0 & 0 & 0 & 1 \\ -2 & 0 & 0 & 0 & 2 \\ -1 & 0 & 0 & 0 & 1 \end{bmatrix}$$

$$\hat{h}_y = \begin{bmatrix} -1 & -2 & -1 \\ 0 & 0 & 0 \\ 0 & 0 & 0 \\ 0 & 0 & 0 \\ 1 & 2 & 1 \end{bmatrix}$$

As with the Sobel technique these latter two matrix filters are convolved with the input image: $L_x = I*\hat{h}_x$, $L_y = I*\hat{h}_y$, to detect horizontal and vertical edges. The results of the two convolutions are then combined:

$$L_{mag} = \sqrt{L_x^2 + L_y^2}$$

to form the "level" edge intensity map.

The final edge-intensity map is obtained by weighted averaging of the Sobel and level edge-intensity maps using a weight, ω, which is chosen empirically.

$$I_{mag} = \omega \times S_{mag} + (1-\omega) \times L_{mag}$$

The expressions for $S_{mag}$ and $L_{mag}$ are somewhat difficult to implement because they contain the square root operation. Therefore, in accordance with a preferred embodiment, to facilitate simple implementation of the edge detection mechanism, the expressions for $S_{mag}$ and $L_{mag}$ are simplified. In particular, it has been found that acceptable edge maps are obtained if the square root operators in the expressions for $S_{mag}$ and $L_{mag}$ are approximated by using an absolute value operation. This modification simplifies the implementation without sacrificing the edge map quality. The resultant expression for $I_{mag}$ is given below.

$$I_{mag} = I_x + I_y$$

where $$I_x = \omega \times |S_x| + (1-\omega) \times |L_x|$$

$$I_y = \omega \times |S_y| + (1-\omega) \times |L_y|$$

The above expression for $I_{mag}$ requires 4 convolutions which are also cumbersome to implement. The number of convolutions can be reduced by realizing that, in most cases, $S_x$ has the same sign as $L_x$, and $S_y$ has the same sign as $L_y$. Therefore, the intensity expressions $I_x$ and $I_y$ can be written as:

$$I_x = |I*g_x|, \quad I_y = |I*g_y|$$

where $$g_x = \omega \times h_x + (1-\omega) \times \hat{h}_x$$

$$g_y = \omega \times h_y + (1-\omega) \times \hat{h}_y$$

The horizontal and vertical edge map information can be generated by means of the structure illustrated in FIG. 3. For purposes of discussion, assume that the structure in FIG. 3 is used to generate the horizontal edge map. The same structure would be used for generating the vertical edge map, but it omitted to simplify the discussion. The Y luminance pixel data array on bus 300 is provided to a "sharp" filter (the Sobel filter) 302 and to a "level" filter 304. The luminance information is convolved with each of the filter matrices. The output of the sharp filter 302 is provided to a digital multiplier 306 where it is multiplied by the weighting factor 308 ($\omega$). The weighting factor $\omega$ is also provided to a subtraction apparatus 310 to generate the weighting factor 1−$\omega$. The output of the convolution of the input image with the level filter is multiplied by the weighting factor 1−$\omega$ in multiplier 312 and the products, 314 and 320, of the multipliers 306 and 312 are added in summer 316 to generate the horizontal magnitudes 318. As mentioned above a similar process would be used to generate the vertical magnitudes.

The generation of the binary edge map is illustrated in FIG. 4. The Y luminance information is applied over bus 400 to apparatus 402 for generating the horizontal edge magnitudes using the $g_x$ function discussed above and to apparatus 406 for generating the vertical edge magnitudes using the $g_y$ function discussed above. The weighting parameter 404 ($\omega$) is applied to both the horizontal edge apparatus 402 and the vertical edge apparatus 406 in accordance with the above expressions. The horizontal edge magnitudes on bus 412 and the vertical edge magnitudes on bus 408 are both applied to a summer 410 to generate the final edge-intensity map.

Thresholding and Thinning

The edge-intensity map produced by the aforementioned filtering operations is compared to a predetermined threshold (T) in order to create a binary edge map. Since the number of edge pixels in the edge map is directly dependent on the threshold level, the bit rate can be controlled by varying the threshold value. In particular the output of the summer 410 is applied to thresholding apparatus 416 where the input values are compared against the threshold T (414).

The binary edge map obtained on bus 418 from the threshold apparatus 416 is "thick" (the edges are several pixels wide) and hence cannot be encoded efficiently. Therefore, a thinning operation must be performed to produce edges that are single pixel wide. In accordance with an illustrative embodiment, a thinning technique is used in which every pixel in the edge-intensity map that is over the threshold T is checked for a local maximum in both the horizontal and vertical directions. If the pixel under consideration is a local maximum in the horizontal direction, but not the vertical, then it is considered an edge pixel only if $I_x > I_y$ for that pixel. Similarly, if the pixel under consideration is a local maximum in the vertical direction, but not the horizontal, then it is considered an edge pixel only if $I_y > I_x$. This processing eliminates false edges and is illustrated in FIG. 4 by the apparatus 420. An expression which illustrates the thinning technique is shown below. Let c represent the edge-intensity of the pixel under consideration (the current pixel), u represent the edge intensity of the pixel in the row immediately "above" the row of the current pixel and d represent the edge intensity of the pixel in the row immediately below the row of the current pixel. Similarly, let l and r represent the edge intensities of the pixel to the immediate left and right in the same row as the current pixel, respectively. With these definitions, the current pixel is an edge pixel if:

[c>u AND c≥d AND c>l AND c≥r] OR

[(c>u AND c≥d AND $I_y > I_x$) OR (c>l AND c≥r AND $I_x > I_y$)]

Edge or Contour Encoding

The edge map produced by edge detection has to be encoded for efficient transmission. The encoding process used in the illustrative embodiment involves three steps:

8-connected to 4-connected pixel conversion;

Edge filtering; and

Chain coding

8-connected map to 4-connected map conversion

An 8-connected pixel array is a pixel array in which each pixel has 8 possible neighbors. Such an array is illustrated in FIG. 5A which illustrates part of an image pixel array. As shown in FIG. 5A, the pixel under consideration, 500, can have eight possible neighbors illustrated by x's. A reduction in bit rate can be achieved if the 8-connected array is converted into a 4-connected array before encoding. Also, the 4-connected array makes the implementation of the subsequent modules much simpler. A four-connected array is illustrated in FIG. 5B which also illustrates part of an image pixel array. In FIG. 5B, the pixel under consideration, 502, can have only four possible neighbors indicated by x's. These neighbors fall only on the same row or column as the pixel under consideration, all "diagonal" pixels are not possible.

Consequently, the edge coding process converts the input edge map generated by the thresholding apparatus into a 4-connected map and then performs the encoding. The process is illustrated in FIGS. 6A and 6B. FIG. 6A shows a pixel under consideration, 600, which has neighbors 602 and 604. Neighbor 604 is located on a "diagonal" and, thus, the array is eight-connected. This eight-connected array is converted into a four-connected array as shown in FIG. 6B. In FIG. 6B, the pixel under consideration, 606, has only two neighbors, 608 and 610 and is four-connected. The addition of pixel 610 has converted the array from an eight-connected array to a four-connected array. A similar process is used to convert the entire edge-map into a four-connected edge map.

Edge filtering

The edge map for an image contains many edges or contours, each representing an object present in the image. Typically, long contours correspond to important features, while short contours are usually produced by noise. Therefore, in order to encode the edge map efficiently, short contours are eliminated by determining the length of each contour and discarding those with lengths that fall below a predetermined threshold $L_{min}$. This step is referred to as edge or contour filtering.

Chain coding

The filtered edges are then encoded by a process known as "chain coding." This is a conventional process and is described in detail in the aforementioned Carlsson article, the description of which is hereby incorporated by reference. In chain coding, rather than represent the row and column position of each pixel on a contour, the direction of the next pixel from the current pixel is encoded. Since the edge map is four connected, a "next" pixel in an edge can be located in one of three directions from a "current pixel". This is illustrated in FIG. 7 in which the edge is progressing in direction 700. The current pixel 702 can only have a neighboring pixel in one of the three directions 704, 706 or 708. The direction can be coded with only a few bits and thus a significant bit rate reduction can be achieved with chain coding.

In accordance with the chain coding technique, each contour is represented with a starting point is found by simply scanning the edge map, row by row, for the first non-zero pixel. Once the starting point has been found, the following procedure is used:

Find the next pixel on the contour by searching the neighbors clockwise for a non-zero pixel.

Generate a code which represents the direction of the next pixel relative to the current direction.

Delete the current contour pixel, go to the next pixel, and update the current direction.

This process is continued until the whole contour is traced. Each direction can be represented with $\log_2(3)$ bits. If the conventional technique of statistical coding is used on the sequence of direction codes, an even lower bit rate of about 1.3 bits/contour point can be obtained as discussed in detail in the aforementioned Carlsson reference. There is also an overhead of 9 bits/contour to encode the starting point.

Contour Data Extraction

Edge-based image representation requires encoding of the binary edge map and also the contour data of the image. The contour data conventionally consists of intensity values of contour data pixels to the left and to the right of each contour pixel.

Figure 8A:
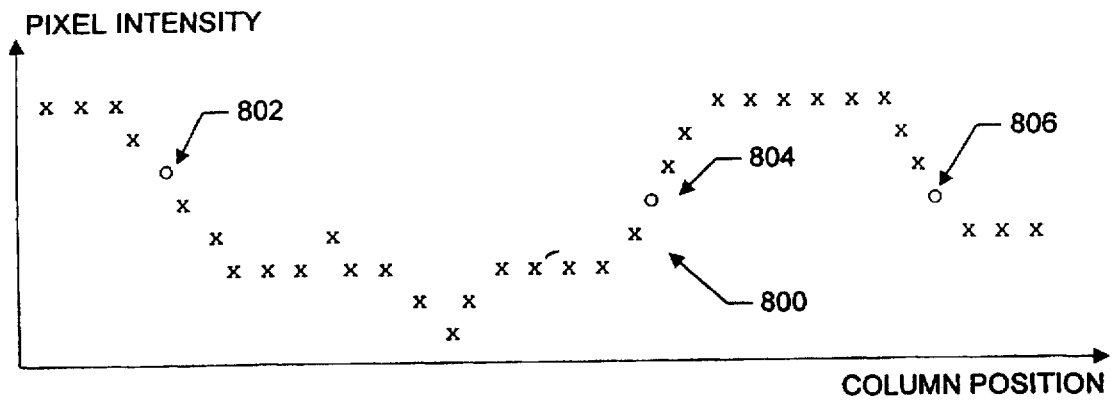
FIGS. 8A–8C are schematic diagrams illustrating the extraction of contour data by line-fitting.
Figure 8B:
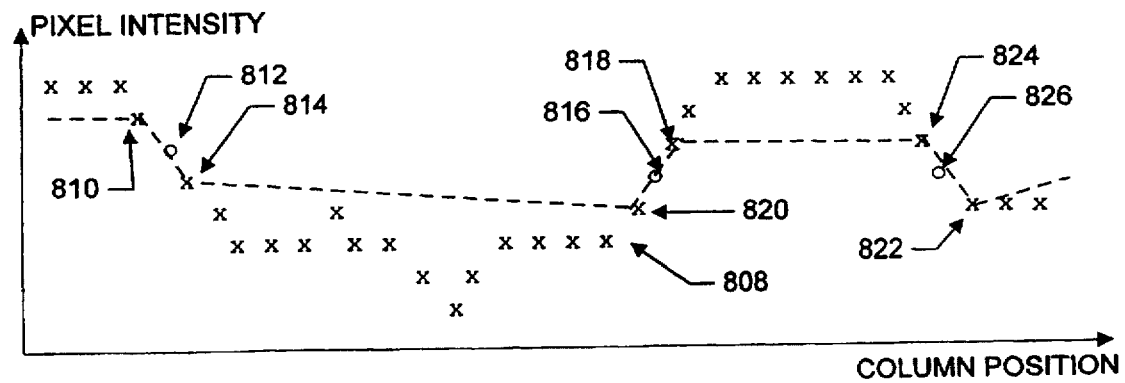

As mentioned above, in the reconstructed image, the image intensity between contours is obtained by a linear approximation. For good reconstruction, the contour data must be chosen so as to obtain a near-optimal linear approximation. The prior art technique for extracting contour intensity data is to use the intensities of pixels immediately to the right and left of each contour pixel as the contour intensity data. However, in many instances, this leads to poor reconstruction. An example is illustrated in FIGS. 8A and 8B. FIGS. 8A and 8B are graphs of pixel intensities versus column position in a portion of an image array. In FIG. 8A, in the graph 800, the pixel intensities for each column along a single row are represented by x's. The small o's (802, 804 and 806) represent edge pixels detected by the aforementioned edge detection process.

As shown in FIG. 8B, if the contour data is taken to be the intensities of the pixels immediately to the left and right of the edge pixels, a poor representation of the data results. For example, assume pixel intensity values 810 and 814 are used for the contour data for edge pixel 812; pixel intensity values 808 and 818 are used for contour data for edge pixel 816 and pixel intensity values 822 and 824 are used for contour data for edge pixel 826. In this case, when linear interpolation is used to reconstruct the pixel intensity values at the receiver, the reconstructed pixel intensity values will lie along the dotted line and represent a poor reconstruction of the actual input data.

Contour Data Line Fitting

In accordance with the principles of the invention, the reconstruction accuracy using linear interpolation is significantly improved by finding the best linear approximation for the pixel intensity values between edges and then using the end points as the contour intensity data. The approximation is done horizontally as well as vertically. The horizontal approximation is obtained by fitting a line to the pixel intensity values on a row between two columns in which consecutive edge pixels are positioned. Processing performed for each row of the image. The end points of this line are then used as horizontal contour intensity data. Procedures for fitting a line to a set of data points in order to minimize errors are well-known and will not be discussed in detail herein.

The vertical approximation is obtained by fitting a line to the pixel intensity values in a column between two rows in which consecutive edge pixels are positioned. Processing is also performed for each column of the image. The end points of this line are then used as vertical contour intensity data. Finally, the results of the two approximations are combined, by averaging if needed, to obtain the required contour intensity data.

Figure 8C:
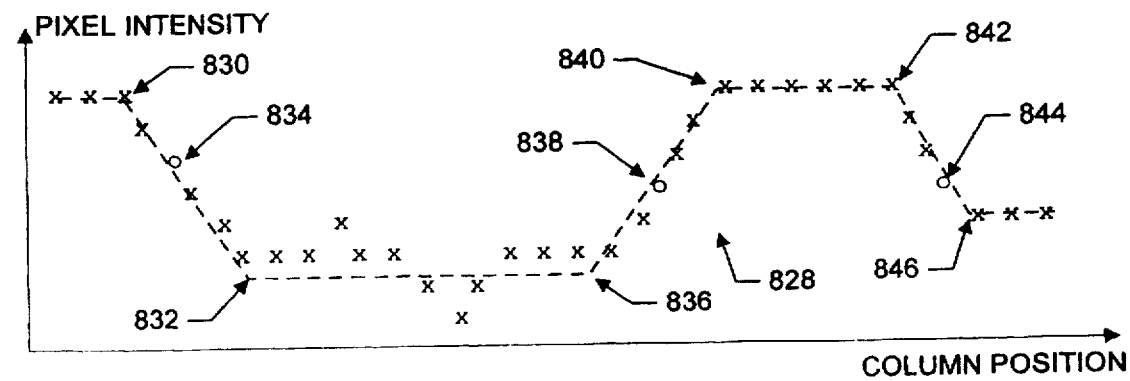

The results of line fitting are illustrated in FIG. 8C which shows the same intensity profile 828 as illustrated in FIGS. 8A and 8B. Using the line-fitting technique, pixel intensity values 830 and 832 will be chosen as the contour data for edge pixel 834. Pixel intensity values 836 and 840 will be chosen as the contour data for edge pixel 838 and pixel values 842 and 846 will be chosen as the data for edge pixel 844. Consequently, the reconstructed pixel intensity values will lie on the dotted line, resulting in a good reconstruction. Experimental results verify that the quality of reconstruction is improved significantly by the line-fitting approach.

Contour Data Encoding

Once the contour intensity data is obtained, it has to be compressed for transmission. In accordance with the principles of the invention efficient compression is achieved by exploiting the redundancy in the contour intensity data for a given edge. Since the pixel intensity values between edges will vary in a smooth manner (due to the reconstruction by linear approximation), it can also be assumed that there will be a smooth variation in the contour intensity data along on each side of a particular edge. Accordingly, the contour data along on each side of an edge could be represented with just one parameter, namely, the average of all of the pixel intensity values along one side of an edge. However, the use of the average to represent the contour data does not produce good results because the edge extraction process in not perfect.

In accordance with the principles of the invention, the contour data along each side of an edge is partitioned into groups and then each group is encoded as its average value. In the preferred embodiment, the groups each have an equal number of pixel intensity values called $L_{max}$.

Figure 9:
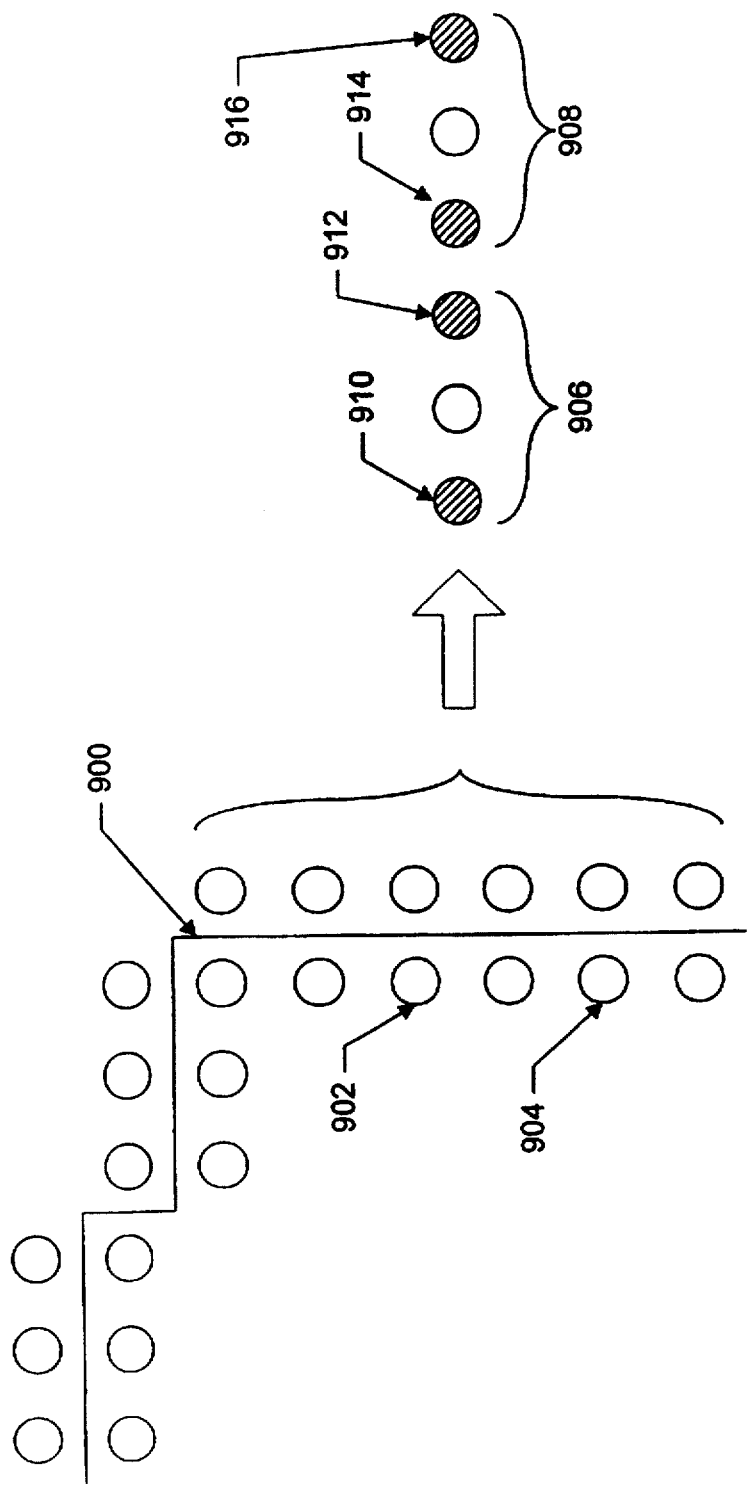
FIG. 9 is a schematic diagram illustrating group coding of the contour data pixel values.

This process is illustrated in FIG. 9. Line 900 represents a series of edge pixels. The circles, for example, circles 902 and 904, schematically represent contour data values. FIG. 9 shows in a schematic fashion the encoding of a portion of the contour data values corresponding to edge 900. In particular, the six contour data values corresponding to the right side of the vertical leg of edge 900 have been broken into two groups of three. Each of these two groups can be encoded as the average value of the three pixels, 906 and 908. It has been found that breaking the contour data values into groups of ten for each side of an edge produces a good reconstructed image.

In addition, it is possible by examining the data to further improve the compression ratio. For example, if the end pixel values in each group (910, 912 and 914, 916, respectively) are examined it may be possible to expand the group and use the average of the pixel intensity values in this larger group. For example, if pixel intensity values 912 and 914 are close in value, the entire group of six pixels can be encoded by using the average of the six values.

Residual Information Mean Encoding

As described in the previous section, the reconstructed image is obtained by interpolating the contour intensity data. Because of imperfections in edge extraction, which lead to open contours, the interpolation of the contour intensity data tends to diffuse the intensity of one object into its neighboring regions, causing reconstruction errors. In prior art approaches, in order to reduce this error, the residual image, which is obtained by subtracting the interpolated image from the original image, is also encoded. Conventional methods employed for residual coding include waveform coding techniques like Laplacian pyramid coding as described in the aforementioned Carlsson article. These coding techniques, however, are not feasible for very low bit rate applications.

In accordance with the principles of the invention, mean coding is performed on the input image to reduce the reconstruction error while keeping the bit rate down. In mean coding, the input image is partitioned into equal sized blocks (for example, 10×10 blocks), and the mean value of all of the pixel intensities in each block is computed. This mean value is then encoded and transmitted.

Figure 10:
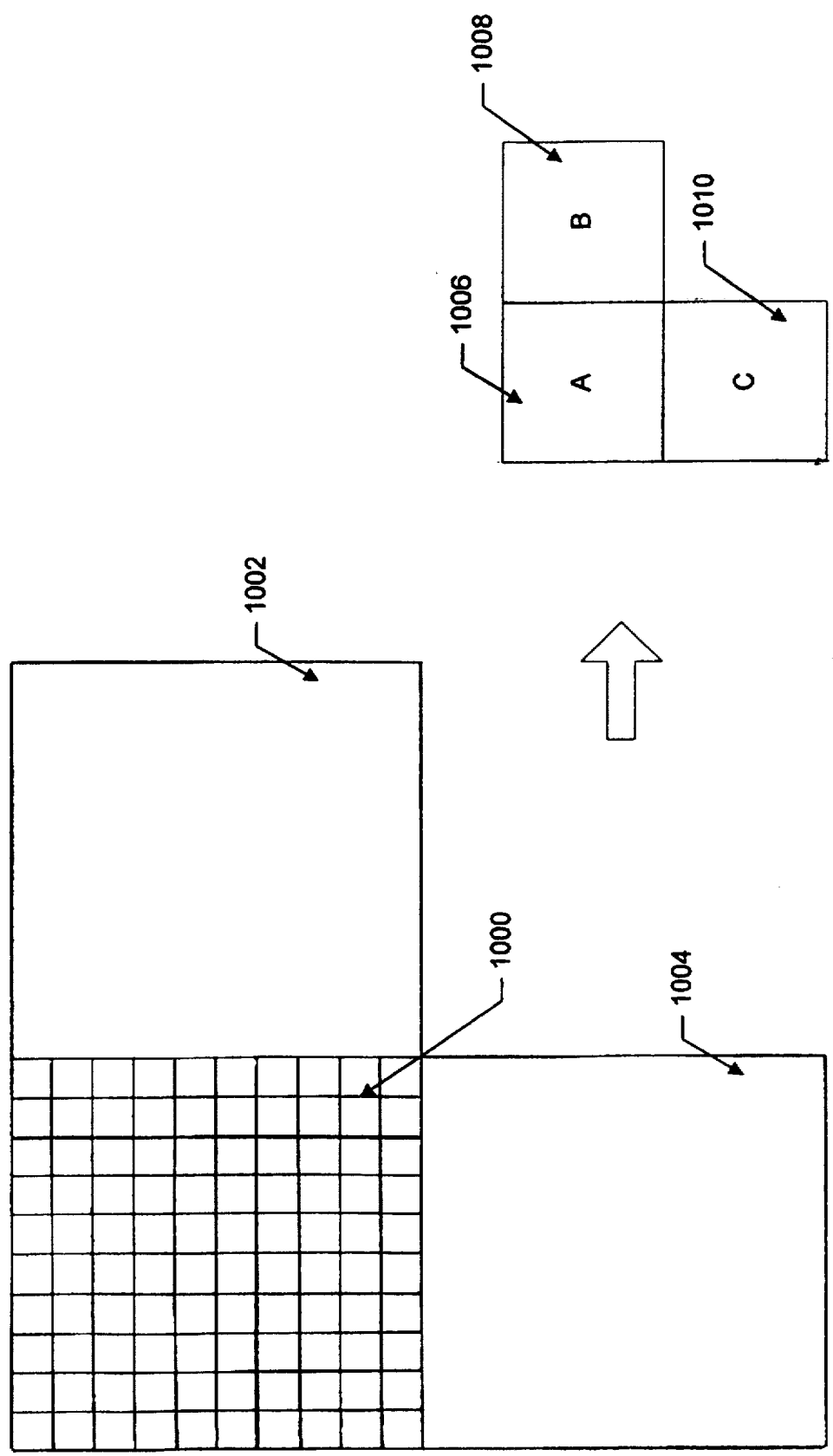
FIG. 10 is a schematic diagram illustrating mean coding of a digitized video image.

This process is illustrated in FIG. 10. In particular, the input image partially represented by the shape at the left side of the page, is broken into equal sized blocks. Three blocks 1000, 1002 and 1004 are shown, the actual image would consist of many more such blocks. As illustrated, each block, such as block 1000 is comprised of a plurality of pixel intensity values. Ten-by-ten blocks are illustrated. The means of all of the pixel intensity values in each block is computed and used to represent the block. Thus, block 1000 is represented by a single value 1006 which consists of the means value "A". Similarly, block 1002 is represented by value 1008 which consists of the means value "B". Block 1004 is represented by the value 1010 and the means value "C".

Residual Information Decoding

The receiver uses the mean information and the interpolated image to obtain an acceptable reconstruction of the input image. One simple way to use the mean information is to break the image reconstructed by linear interpolation into equal-sized blocks where the size of the blocks is the same as the size of the blocks used to encode the input image as described above. Then the mean in each block of the reconstructed, interpolated image is modified so that it matches the mean of the corresponding block of the input image, which latter mean has been transmitted to the receiver. Unfortunately, this method does not correct line artifacts which are caused by the interpolation technique used to construct the image.

In accordance with the principles of the invention, it has been found that the line artifacts can be reduced considerably if all of the pixel intensity values in each non-edge block in the reconstructed image are set to the mean of the corresponding block in the input image. As a result of this processing, all non-edge blocks in the reconstructed image become constant intensity blocks, and thereby lose any texture present in the input image. This loss of texture in non-edge blocks is, however, not crucial because texture information is not necessary in low bit rate applications.

Figure 11:
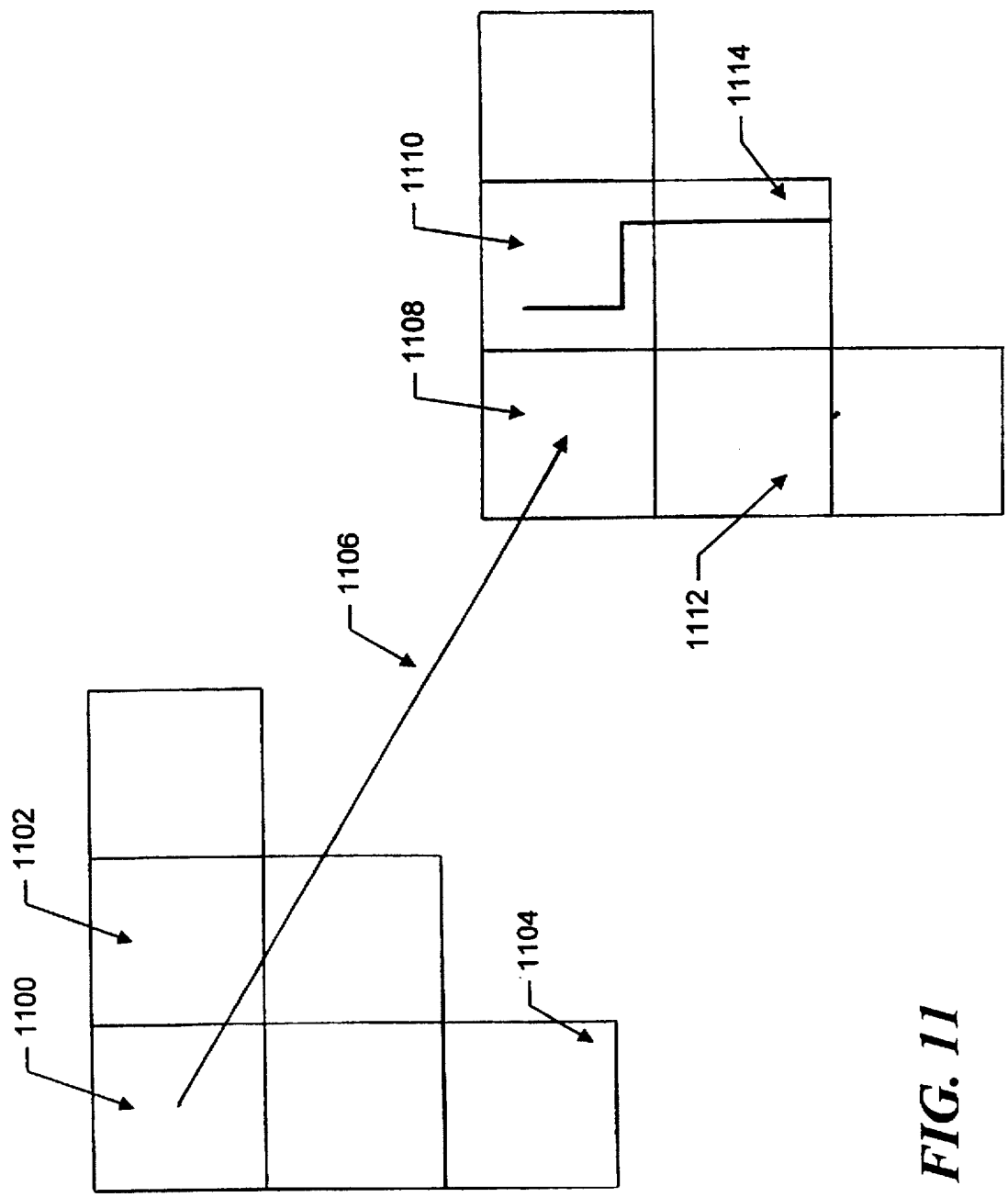
FIG. 11 is a diagram illustrating adjustment of a reconstructed image using the mean coded values generated by the encoder.

This technique is illustrated in FIG. 11 which illustrates a portion of the input image broken into blocks on the left part of the figure and the corresponding portion of the interpolated, reconstructed image on the right side of the figure. As previously described the input image is broken into a plurality of equal-sized blocks, such as blocks 1100, 1102 and 1104. Then means of the pixel values in these blocks is calculated and transmitted to the receiver as illustrated in FIG. 1 (bus 124.)

At the receiver side, the interpolated image is adjusted (as illustrated in block 226, FIG. 2) by setting all pixel intensity values in the corresponding non-edge block to the received means value. Thus, all of the pixel intensity values in block 1108 of the reconstructed image would be set to the mean value of block 1100 as illustrated schematically by line 1106. Similarly, block 1112 would be adjusted in the same manner as well as the remaining non-edger blocks. Blocks which contain edges, such as blocks 1110 and 1114 would be left with the values obtained by the interpolation as previously described.

Another significant advantage of mean coding over the prior art residual coding techniques is that in mean coding, the encoder does not have to compute the interpolated image, and therefore, has simpler structure.

Bit Rate Estimation

Unlike prior art fixed-bit-rate compression schemes like "vector quantization", the bit rate of the edge-based compression technique depends on the content of the input image and, thus, cannot be fixed in advance of knowledge of the data. However, with some assumptions concerning the rate controlling parameters of the technique, a bit rate can be estimated.

The following parameters control the bit rate:

Edge detection threshold T;

Edge weight, $\omega$, for combining sharp and level edges;

Minimum contour length, $L_{min}$, for contour coding;

Minimum contour length, $L_{max}$, for intensity coding.

The edge weight, $\omega$, and minimum contour length, $L_{min}$, vary from image to image. But for most images, $\omega=0.5$ and $L_{min}=6$ to 10 produce good results. Similarly, $L_{max}$ must be chosen experimentally. Our simulation results indicate that a reasonable value for $L_{max}$ is 15 for the Y component of the input. This implies that the contour intensity data is encoded by partitioning each edge into 15 pixel long pieces and transmitting the average intensity on each side. Since the I and Q components are perceptually less important and have much less information than the Y component, they are encoded with $L_{max}=\infty$ (the average value of the pixel intensities for all of the pixels along an entire edge are used as the encoded value).

As opposed to the other parameters, T can not be chosen a priori. The only way to achieve a given fixed bit rate is to start with a pre-determined T and then fine-tune it until the desired bit-rate is obtained. The fine-tuning, however, does not have a serious impact on the speed of the overall algorithm because it has been found that the correct threshold level can be reached with very few iterations, each involving thresholding and thinning of the edge-intensity map and then estimating the bit rate. It is important to note that the edge-intensity map has to be computed only once.

With these assumptions concerning the rate-controlling parameters, the bit rate can be estimated. There are three main parts in the encoding method that contribute to the total bit rate: edge encoding (chain encoding), contour data encoding, and mean encoding.

The performance of edge encoding has been studied extensively by many researchers. From their results as discussed in detail in the aforementioned Carlsson article, the number of bits required for edge encoding can be estimated to be $1.3L_c+9N_c$, where $L_c$ is the total number of edge pixels in the binary image map and $N_c$ is the number of distinct contours or edges.

Contour data encoding is performed by breaking each edge in the image into $L_{max}$ pixel long pieces and then average encoding the intensity on each side. Experimental results indicate that for $L_{max}=15$, which is the value chosen for the Y component, the total number of contour pieces equals $2N_c$ on the average. This implies that intensity coding for the Y component requires $2N_c \times 2$ parameters since contour data must be encoded for each side of an edge. On the other hand, since $L_{max}$ is chosen to be $\infty$ for the I and Q components, each of them require $N_c \times 2$ parameters. If each parameter is quantized to 4 bits, the total number of bits needed for intensity coding becomes $32N_c$.

As previously mentioned, the Y component is encoded with a block size of 10×10, while the I and Q components are encoded with 20×20 blocks. If the image size is N×M, the number of mean values resulted in about 2.7 bits per mean. Thus, the number of bits required for mean coding can be estimate to be (3.6NM)/100.

Combining all the above estimates, the total bit rate of our compression algorithm can be expressed as:

$$1.3L_c + 41N_c + \frac{3.6NM}{100}$$

The Inventive method is capable of delivering acceptable quality images at 0.1 to 0.3 bpp for 256×256 color image. Experimental results suggests that the method works well for images with limited amount of texture, such as facial images. This, however, is not a drawback in the case of many low bit rate applications, for example videophones, where the inputs images can be assumed to be facial.

The foregoing description has been limited to a specific embodiment of this invention. It will be apparent however, that variations and modifications may be made to the invention, with the attainment of some of its advantages. For example, the inventive method may be implemented preferably with high-speed hardware. However, it may also be implemented in software or firmware with attendant advantages. Therefore, it is the object of the appended claims to cover all such variations and modifications as come within the true spirit and scope of the invention.

What is claimed is:

1. Apparatus for compressing a video image comprised of a row and column array of image pixel values the apparatus comprising:

means responsive to the image pixel values for identifying a plurality of edges in the video image, each of the plurality of edges being comprised of a line of contour pixels at which a value discontinuity occurs in the array of image pixel values;

means responsive to the contour pixels for encoding a location in the array of image pixel values for each of the contour pixels;

means responsive to the plurality of contour pixels for generating an approximation of the image pixel values between two consecutive ones of the plurality of edges wherein the means for generating an approximation comprises:

means responsive to the contour pixels and operable in each row of the array of image pixel values for detecting the column locations of a pair of consecutive contour pixels located in the each row; and means responsive to the column locations of the detected consecutive contour pixels for determining a first linear approximation of row image pixel values located in the each row between the column locations;

means for using the approximation to produce first and second contour data values representing two image pixel values adjacent to the two consecutive ones of the plurality of edges wherein the approximation using means comprises means for determining the first and second contour data values by inserting the column locations into the first linear approximation; and means for encoding the first and second contour data values.

2. Apparatus for compressing a video image comprised of a row and column array of image pixel values, the apparatus comprising:

means responsive to the image pixel values for identifying a plurality of edges in the video image, each of the plurality of edges being comprised of a line of contour pixels at which a value discontinuity occurs in the array of image pixel values;

means responsive to the contour pixels for encoding a location in the array of image pixel values for each of the contour pixels;

means responsive to the plurality of contour pixels for generating an approximation of the image pixel values between two consecutive ones of the plurality of edges;

means for using the approximation to produce first and second contour data values representing two image pixel values adjacent to the two consecutive ones of the plurality of edges;

means for encoding the first and second contour data values;

means responsive to the contour pixels and operable in each column of the array for detecting the row locations of a pair of consecutive contour pixels located in the each column;

means responsive to the row locations of the detected consecutive contour pixels for selecting column image pixel values located in the each column between the row locations;

means responsive to the selected column image pixel values for determining a second linear approximation of the selected column image pixel values;

means for determining a third and a fourth contour data values by inserting the row locations into the second linear approximation; and means for encoding the third and fourth contour data values.

3. Apparatus for compressing a video image comprised of a row and column array of image pixel values, the apparatus comprising:

means responsive to the image pixel values for identifying a plurality of first edges in the image, each first edge being comprised of a line of contour pixels at which a value discontinuity occurs in the array of image pixel values over a first number of image pixel values;

means responsive to the image pixel values for identifying a plurality of second edges in the image, each second edge being comprised of a line of contour pixels at which a value discontinuity occurs in the array of image pixel values over a second number of image pixel values;

means for combining the first edges with the second edges to generate a composite edge intensity map;

means responsive to the composite edge intensity map for encoding a location in the array for each of the contour pixels;

means responsive to the contour pixels for determining two contour data values for each pixel; and means for encoding the two contour data values.

4. Apparatus according to claim 3 wherein the second number of image pixel values is greater than the first number of image pixel values.

5. Apparatus according to claim 3 wherein the means for identifying a plurality of first edges generates a first edge intensity map, the means for identifying a plurality of second edges generates a second edge intensity map and the combining means averages the first edge intensity map with the second edge intensity map.

6. Apparatus according to claim 5 wherein combining means comprises means for weighting the first and second edge intensity maps.

7. A method for compressing a video image comprised of a row and column array of image pixel values, the method comprising the steps of:

A. identifying a plurality of edges in the image, each edge being comprised of a line of contour pixels at which a value discontinuity occurs in the array of image pixel values;

B. encoding a location in the array for each of the contour pixels;

C. generating an approximation of the image pixel values between two consecutive ones of the plurality of edges;

D. using the approximation to produce a first and a second contour data values representing two image pixel values adjacent to the two consecutive ones of the plurality of edges; and E. encoding the first and second contour data values.

8. The method of claim 7 further comprising the step of:

detecting the row locations of a pair of consecutive contour pixels located in the each column;

selecting column image pixel values located in the each column between the row s locations of the detected consecutive contour pixels;

determining a second linear approximation of the selected column image pixel values;

determining third and fourth contour data values by inserting the row locations into the second linear approximation; and encoding the third and fourth contour data values.

9. The method of claim 7 wherein the step of generating an approximation comprises the steps of:

detecting the column locations of a pair of consecutive contour pixels located in each row;

determining a first linear approximation of row image pixel values located in the each row between the column locations of the detected consecutive contour pixels.

10. The method of claim 9 wherein the step of using the approximation comprises the step of determining the first and second contour data values by inserting the column locations into the first linear approximation.

11. A method for compressing a video image comprised of a row and column array of image pixel values, the method comprising the steps of:

A. identifying a plurality of first edges in the image, each first edge being comprised of a line of contour pixels at which a value discontinuity occurs in the array of image pixel values over a first number of image pixel values;

B. identifying a plurality of second edges in the image, each second edge being comprised of a line of contour pixels at which a value discontinuity occurs in the array of image pixel values over a second number of image pixel values;

C. combining the first edges with the second edges to generate a composite edge intensity map;

D. encoding a location in the array for each of the contour pixels;

E. determining two contour data values for each pixel; and

F. encoding the two contour data values.

12. The method of claim 11 wherein the second number of image pixel values is greater than the first number of image pixel values.

13. The method of claim 11 wherein:

the step of identifying a plurality of first edges includes the step of generating a first edge intensity map;

the step of identifying a plurality of second edges includes the step of generating a s second edge intensity map; and the step of combining the first edges with the second edges includes the step of averaging the first edge intensity map with the second edge intensity map.

14. The method of claim 13 wherein the step of combining includes the step of weighting the first and second edge intensity maps.

* * * * *

UNITED STATES PATENT AND TRADEMARK OFFICE
CERTIFICATE OF CORRECTION

PATENT NO : 5,790,269
DATED : August 4, 1998
INVENTOR(S) : Masaki et al.

It is certified that error appears in the above-identified patent and that said Letters Patent are hereby corrected as shown below:

Col. 7, line 11, delete "it" and replace with --is--.

Col. 9, line 14, delete "with" and replace with --when--.

Col. 9, line 44, delete "However" and replace with --however--.

Col. 10, line 41, delete "on".

Col. 10, line 47, delete "in" and replace with --is--.

Col. 13, line 53, add "," after "values".

Col. 15, line 46, delete "s".

Signed and Sealed this

Twenty-fourth Day of April, 2001

NICHOLAS P. GODICI

*Attest:*

*Attesting Officer*    Acting Director of the United States Patent and Trademark Office